United States Patent [19]

Bellati

[11] 4,388,004
[45] Jun. 14, 1983

[54] SHAFT BEARING ARRANGEMENT

[75] Inventor: Hans Bellati, Wettingen, Switzerland

[73] Assignee: BBC Brown, Boveri & Co. Ltd., Baden, Switzerland

[21] Appl. No.: 270,553

[22] Filed: Jun. 4, 1981

[30] Foreign Application Priority Data

Jun. 16, 1980 [EP] European Pat. Off. ........... 80200559

[51] Int. Cl.³ ............................................. F16C 35/02
[52] U.S. Cl. .................................... 384/397; 384/428
[58] Field of Search ...................... 308/15, 22, 121, 73, 308/160, 161, 168, 175, 170, 122; 415/170 R; 384/302, 306, 307, 308, 368, 397, 428, 438

[56] References Cited

U.S. PATENT DOCUMENTS 449,956  4/1891  Simonds .............................. 308/175
4,090,743  5/1978  Suzuki et al. ...................... 308/170
4,201,426  5/1980  Garten et al. ................... 415/170 R Primary Examiner—Lenard A. Footland
Attorney, Agent, or Firm—Werner W. Kleeman

[57] ABSTRACT

There is disclosed a combined thrust and support bearing arrangement wherein the shaft line can be constructed to be relatively short and wherein there does not arise any lifting of the turbine housing. The support or journal bearing and the thrust bearing are arranged in a respective bearing support within a common housing. Holders or holder elements are arranged at the bearing support of the support bearing over its circumference. These holder elements piercingly extend without contact through the bearing support of the thrust bearing. A common oil supply is provided for the thrust bearing and the support or journal bearing.

7 Claims, 2 Drawing Figures

SHAFT BEARING ARRANGEMENT

BACKGROUND OF THE INVENTION

The present invention relates to a new and improved construction of bearing arrangement for rotary or rotating machines, especially for the shafts of multi-stage turbines, comprising at least one support or journal bearing and one thrust bearing.

Depending upon the operating state of the rotary machine, i.e. during start-up, under load, during idle running or during shutdown or even during standstill there arise in the case of turbomachines elongations in axial direction. These axial elongations or expansions of the shaft and housing can be of different magnitude. The greater the length of such type turbosets and the greater the temperature gradient during load changes that much greater are also the differences in the lengthwise expansion arising between the shaft and housing. In order to compensate for such type expansion differences it is possible to appropriately increase the axial play which, however, leads to losses in efficiency.

So that the axial play can be maintained as small as possible it has already been proposed to connect the thrust bearing housing with the turbine housing, so that there can be compensated in this manner the different lengthwise expansions arising between the shaft and the housing.

However, such constructions can only be utilised to a limited extent and up to a predetermined turbine size, since otherwise the forces applied to the housing of the thrust bearing become so great that they can lead to lifting and/or blocking of the housing which, in turn, results in damage to the equipment.

Additionally, there are known to the art, for instance from French Pat. No. 899,221, designs wherein the thrust bearing housing is fixedly connected with the foundation. With this construction there are employed separate bearing housings for the support bearing and the thrust bearing.

With such type bearing arrangements the entire length of the shaft line becomes larger and there prevails a greater yieldability of the shafts. This in turn can lead to undesirable scraping of the blading or the shaft seals, and thus, results in noisy running of the turbine.

SUMMARY OF THE INVENTION

Therefore, with the foregoing in mind it is a primary object of the present invention to provide a new and improved construction of shaft bearing arrangement which is not associated with the aforementioned drawbacks and limitations of the prior art proposals.

Another and more specific object of the present invention aims at devising a new and improved bearing arrangement which does not disadvantageously affect the length of the total shaft line and wherein, even in the case of large turbosets, there does not arise any lifting of the turbine housing.

A further significant object of the present invention is directed to a new and improved construction of shaft bearing arrangement which is relatively simple in design, economical to manufacture, extremely reliable in operation, not readily subject to breakdown or malfunction, and requires a minimum of maintenance and servicing.

Now in order to implement these and still further objects of the invention, which will become more readily apparent as the description proceeds the bearing arrangement for rotating machines, especially for the shafts of multi-stage turbines, comprises at least one supporting or support bearing and one thrust bearing. The support bearing and the thrust bearing are arranged in a respective bearing support within a common bearing housing.

By virtue of the inventive design of a combined thrust and support bearing the bearing housing in conjunction with the support bearing forms a unit which can be rigidly connected with the turbine foundation, whereas the thrust bearing remains free to carry out axial movements.

According to a further advantageous construction of the bearing arrangement there can be provided a thrust rod between the thrust bearing support and the turbine housing. This arrangement enables reducing the differential elongation or expansion between the shaft and the turbine housing.

Furthermore, by virtue of the arrangement of a guide wedge or key or equivalent structure between the thrust bearing holding or support arrangement and the bearing housing there can be obtained a lengthwise guide for the bearing support.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
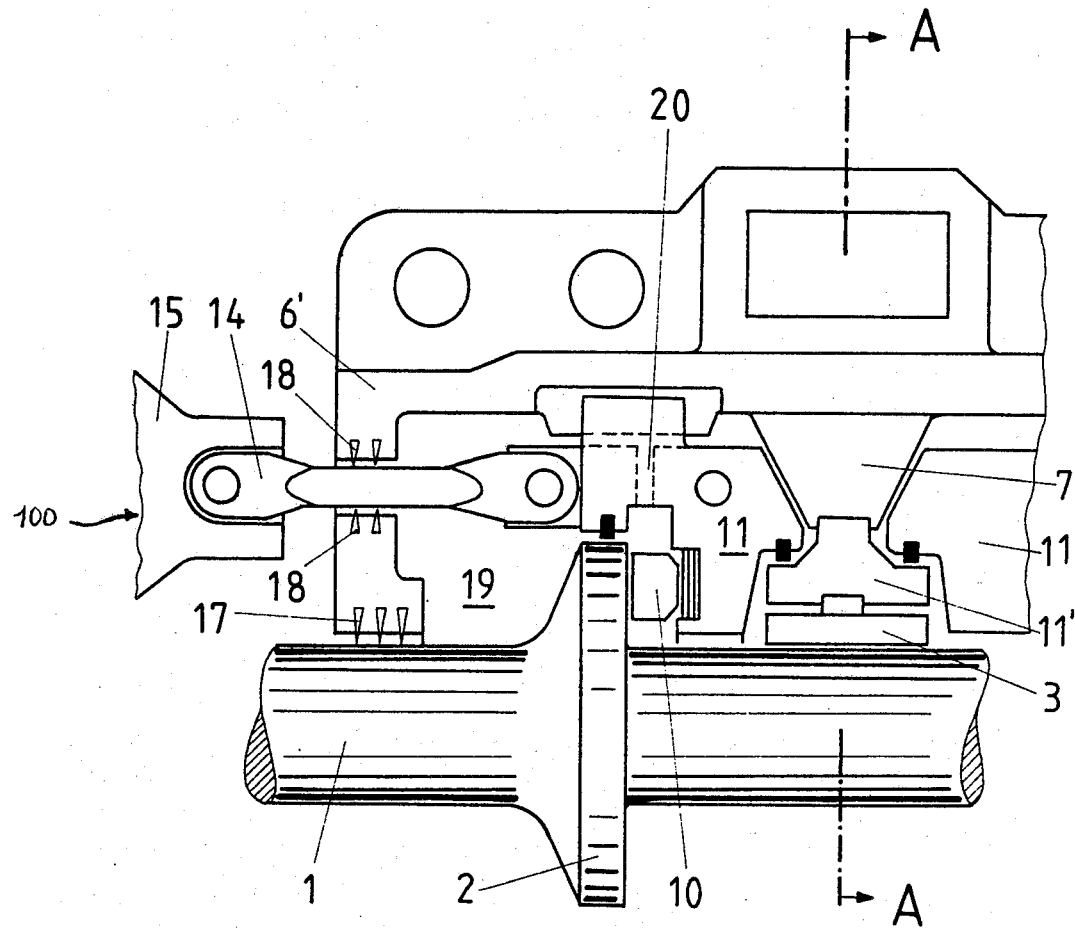
FIG. 1 is a longitudinal sectional view through a combined construction of thrust and support bearing arrangement.
Figure 2:
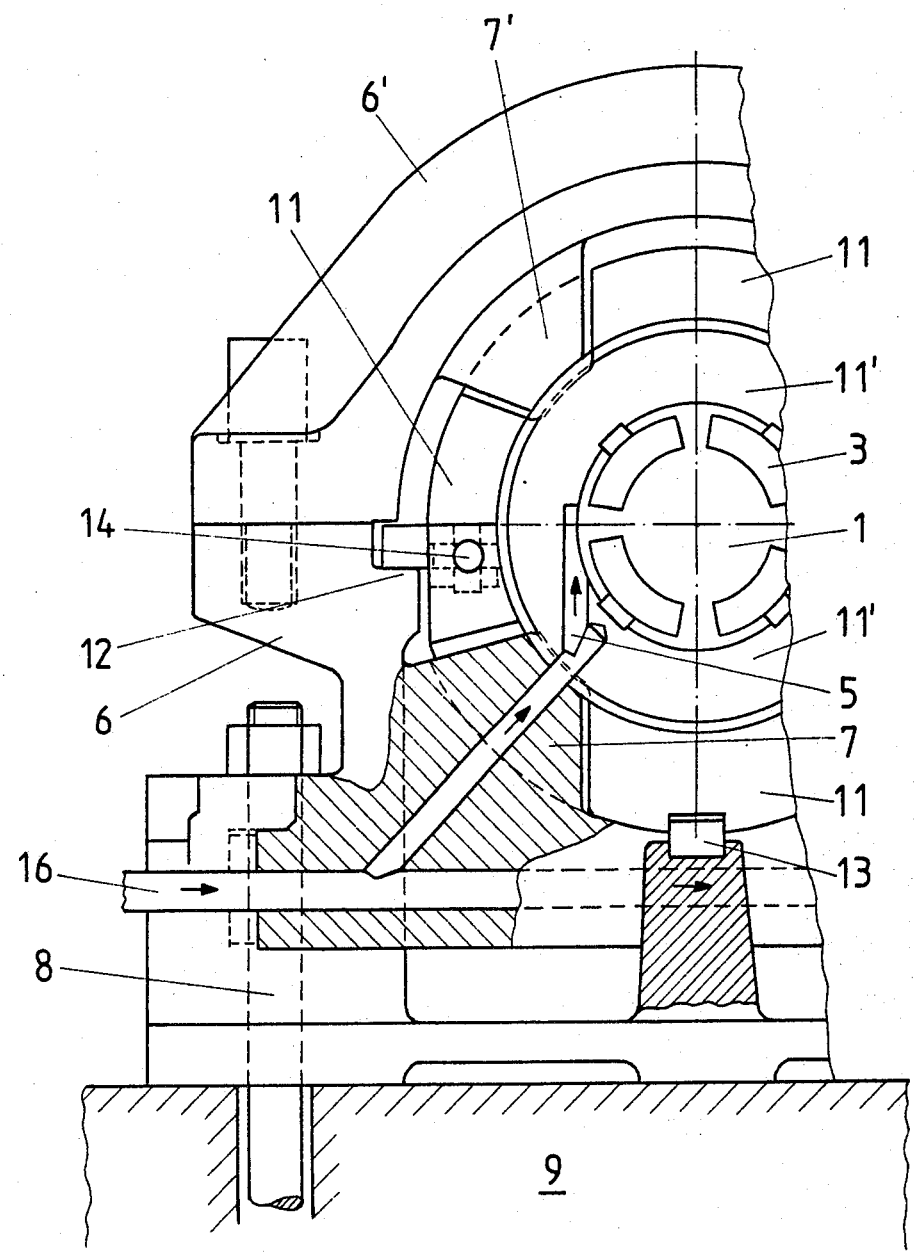
FIG. 2 is a cross-sectional view through the bearing arrangement shown in FIG. 1, taken substantially along the line A—A thereof.

Describing now the drawings, according to the exemplary embodiment of shaft bearing arrangement illustrated in FIGS. 1 and 2 reference character 1 designates a turbine shaft having a shaft thrust collar 2 or equivalent structure and which is mounted within a bearing bushing 3, which also can be constructed as a segmented bearing and serves as a journal or support bearing. The bearing bushing 3 or the segmented bearing is retained in a segmented or divided bearing support or carrier 11'. The bearing support 11' is also provided with lubricant channels 5 for supplying the bushing 3, i.e. the support or journal bearing with lubricating oil. A bearing housing-lower portion 6 and a bearing housing cover 6' are provided with holders or holder elements 7 and 7', respectively, which surround without play and retain the bearing support 11'. The forces applied by the shaft 1 are transmitted by means of the bearing bushing 3, the bearing support 11' and the holders or holder elements 7 and 7' to the bearing housing 6, 6' by means of foundation bolts 8 into a turbine foundation or base structure 9.

The shaft collar 2 of the turbine shaft 1 is mounted in axial direction at a thrust bearing 10 which likewise can consist of individual bearing segments. The thrust bearing 10 is installed in the bearing support 11 which bears within the bearing housing-lower portion 6 upon a nose member 12 and is guided in axial direction by a wedge or key 13 or equivalent structure.

In order to reduce the differential expansion between the shaft 1 and the turbine housing, generally indicated in FIG. 1 by reference character 100, a thrust rod 14 is arranged at a housing strap or housing portion 15 and at the bearing support 11. In this way it is possible to introduce the housing expansions by means of the bearing support 11 and the thrust bearing 10 to the shaft 1.

The requisite quantity of lubricant, here lubricating oil, is introduced to the lubricant channels 5 by means of a lubricant infeed means 16. Between the bearing housing 6, 6' and the shaft 1 there are arranged scraper or stripper rings 17 or equivalent structure and between the thrust rod 14 and the bearing housing 6' there are arranged seals 18 which seal towards the outside an oil withdrawal chamber 19 at the thrust bearing 10, without impairing the mobility of the turbine housing 100 in relation to the turbine shaft 1 and the bearing support 11. The lubricant discharge from the combined support and thrust bearing is accomplished by means of outlet or discharge openings 20 which are distributively arranged throughout the circumference within the bearing support 11.

Due to the inventive bearing design the bearing housing 6, 6' in conjunction with the support or journal bearing 3 forms a unit, whereas the thrust bearing 10 arranged in the same bearing support 11 remains freely movable.

While there are shown and described present preferred embodiments of the invention, it is to be distinctly understood that the invention is not limited thereto, but may be otherwise variously embodied and practiced within the scope of the following claims. Accordingly,

What I claim is:

1. A bearing arrangement for rotating machines, especially for the shafts of multi-stage turbines, comprising:
    at least one support bearing;
    at least one thrust bearing;
    a respective bearing support in which there are arranged the related support bearing and thrust bearing;
    means defining a common bearing housing for the support bearing and the thrust bearing and the related bearing supports; and
    the bearing support of the thrust bearing surrounding the bearing support of the support bearing and being supported at the bearing housing.

2. The bearing arrangement as defined in claim 1, further including:
    holder elements arranged at the bearing support of the support bearing over the circumference thereof; and
    said holder elements piercingly extending without contact through the bearing support of the thrust bearing.

3. The bearing arrangement as defined in claim 1, wherein:
    the support bearing is supported independently of the thrust bearing by means of said bearing housing at a foundation of the machine.

4. The bearing arrangement as defined in claim 1, further including:
    means defining a common oil supply for the thrust bearing and the support bearing.

5. The bearing arrangement as defined in claim 1, wherein:
    the rotating machine comprises a turbine containing a turbine housing; and
    a thrust rod arranged between the bearing support of the thrust bearing and the turbine housing for transmitting axial movements.

6. The bearing arrangement as defined in claim 1, further including:
    guide wedge means arranged between the bearing support of the thrust bearing and the bearing housing.

7. A bearing arrangement for rotating machines, especially for the shafts of multi-stage turbines, comprising:
    at least one support bearing;
    at least one thrust bearing;
    a respective bearing support in which there are arranged the related support bearing and thrust bearing;
    means defining a common bearing housing for the support bearing and the thrust bearing and the related bearing supports;
    the rotating machine comprises a turbine containing a turbine housing; and
    a thrust rod arranged between the bearing support of the thrust bearing and the turbine housing for transmitting axial movements.

* * * * *